US007923400B2

(12) United States Patent
Saito et al.

(10) Patent No.: US 7,923,400 B2
(45) Date of Patent: Apr. 12, 2011

(54) METHOD OF MAKING AN ELECTRODE FOR USE IN A BATTERY

(75) Inventors: Takamitsu Saito, Yokohama (JP); Takuya Kinoshita, Yokosuka (JP); Hideaki Horie, Yokosuka (JP); Kyouichi Watanabe, Yokohama (JP); Osamu Shimamura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1386 days.

(21) Appl. No.: 10/575,346

(22) PCT Filed: Dec. 13, 2005

(86) PCT No.: PCT/IB2005/003765

§ 371 (c)(1),
(2), (4) Date: Apr. 11, 2006

(87) PCT Pub. No.: WO2006/064342

PCT Pub. Date: Jun. 22, 2006

(65) Prior Publication Data

US 2007/0195125 A1 Aug. 23, 2007

(30) Foreign Application Priority Data

Dec. 14, 2004 (JP) ................................ 2004-361516
Dec. 16, 2004 (JP) ................................ 2004-364120

(51) Int. Cl.
*H01M 4/88* (2006.01)
*H01M 4/02* (2006.01)
*H01M 4/36* (2006.01)
*H01M 4/60* (2006.01)
*H01M 4/62* (2006.01)
*B05B 3/02* (2006.01)
*B05B 7/08* (2006.01)
*F23D 11/04* (2006.01)

(52) U.S. Cl. .................. 502/101; 239/214.15; 239/549; 429/209; 429/212; 429/232; 429/523

(58) Field of Classification Search .................. 502/101; 239/214.15, 549; 429/523, 209, 212, 232
See application file for complete search history.

(56) References Cited

U.S. PATENT DOCUMENTS 4,219,443 A * 8/1980 Klinedinst et al. ............ 502/101
(Continued)

FOREIGN PATENT DOCUMENTS

JP 05-174810 7/1993
(Continued)

OTHER PUBLICATIONS

International Search Report—Written Opinion, dated Jul. 18, 2006.

*Primary Examiner* — Patricia L Hailey
(74) *Attorney, Agent, or Firm* — Young Basile

(57) ABSTRACT

A method for preparing an electrode in which droplets of a first electrode ink composition and droplets of a second electrode ink composition are ejected from an ink jet device onto a base material. The first electrode ink composition contains at least one electrode active material and the second electrode ink composition contains at least one binder material. The two ink compositions are deposited in combination to form one of a positive electrode and a negative electrode layer. The resulting electrode is suitable for use in a battery.

14 Claims, 4 Drawing Sheets

U.S. PATENT DOCUMENTS

| | | | | | |
|---|---|---|---|---|---|
| 5,158,843 | A | * | 10/1992 | Batson et al. | 429/231.8 |
| 5,494,562 | A | * | 2/1996 | Maley et al. | 257/414 |
| 5,696,314 | A | * | 12/1997 | McCaffrey et al. | 205/778 |
| 5,707,763 | A | * | 1/1998 | Shimizu et al. | 429/217 |
| 6,447,571 | B1 | * | 9/2002 | Ito et al. | 75/255 |
| 6,967,183 | B2 | | 11/2005 | Hampden-Smith et al. | |
| 7,098,163 | B2 | * | 8/2006 | Hampden-Smith et al. | 502/101 |
| 7,141,270 | B2 | * | 11/2006 | Wittpahl et al. | 427/115 |
| 7,279,015 | B2 | * | 10/2007 | Merker | 29/25.03 |
| 7,713,899 | B2 | * | 5/2010 | Hampden-Smith et al. | 502/101 |
| 2003/0130114 | A1 | | 7/2003 | Hampden-Smith et al. | |
| 2005/0116375 | A1 | * | 6/2005 | Ito | 264/105 |
| 2005/0272595 | A1 | * | 12/2005 | Kobayashi et al. | 502/101 |

FOREIGN PATENT DOCUMENTS

| | | | | |
|---|---|---|---|---|
| JP | 10-092436 | | | 4/1998 |
| JP | 2000-082471 | | | 3/2000 |
| JP | 2002-075330 | A | | 3/2002 |
| JP | 2002-151057 | A | | 5/2002 |
| JP | 2004-186061 | A | | 7/2004 |
| JP | 2004-213971 | A | | 7/2004 |
| WO | 01/80338 | | * | 10/2001 |
| WO | WO 2006064342 | A2 | * | 6/2006 |

* cited by examiner

ENLARGED VIEW

MASS – SPRING MODEL

METHOD OF MAKING AN ELECTRODE FOR USE IN A BATTERY

FIELD OF THE TECHNOLOGY

The present invention pertains to a method of manufacturing an electrode. The resulting electrode is suitable for use in a secondary battery such as one suitable for use in a vehicle motor driving power supply.

BACKGROUND

A strong demand exists for the introduction of electric vehicles (EV) and hybrid electric vehicles (HEV), fuel cell vehicles (FCV) as well as batteries for driving vehicle motors. The use of secondary batteries, which can be recharged repeatedly, as batteries for driving said motors have been proposed. Because EVs, HEVs, and FCVs require high-output and high-energy density, it is difficult to meet these requirements using a single large-size battery. Thus, it is common practice to use an assembled battery comprising multiple batteries connected in series. Thin laminate battery batteries have been suggested as a suitable assembled battery.

In general, a positive electrode and a negative electrode for the battery in question can be fabricated by applying a coating solution containing a positive electrode active material or a negative electrode active material onto a suitable collector. While various kinds of roller coaters can be employed, it has been found that performance quality of the resulting battery can suboptimal due to uneven layer coating. This can manifest as uneven battery heat dissipation which, in turn, may result in partial degradation of the battery. In addition, a battery with localized variations in electrode thickness varies locally is prone to resonate as vibrations are applied to the battery; resulting in cracking and breaking of the base material. This becomes particularly problematic when long battery life is desired or required. For instance in automotive vehicular applications, the expected battery life for the associated vehicle battery may be 10 years or longer.

In order to reduce unevenness of the electrode coating, it has been proposed to control the viscosity of the coating solution. Even so, when a conventional coater is used to apply a liquid containing the electrode active constituent materials, it is difficult to form a film with uniformity above a certain level. For example, when coating is carried out intermittently, the electrode constituent materials accumulate in localized regions resulting in local regions of greater thickness.

Additionally, when high battery output is required, the thickness of the battery may have to be reduced in order to connect many individual batteries in series. However, it is difficult to fabricate an extremely thin battery using a conventional coater.

SUMMARY

An electrode comprising a collector and an active material layer with the active material layer composed of active material particles and a surfactant is disclosed herein. Also disclosed is a battery composed of a positive electrode, an electrolyte layer, and a negative electrode in layered relationship to one another in which at least one of the positive electrode or negative electrode is composed of active material and a surfactant. The disclosure also contemplates a method for manufacturing an electrode catalyst layer for at least one electrode in which droplets of a first electrode ink composition are ejected from a nozzle of an inkjet device onto a base material and droplets of a second electrode ink composition are ejected from a nozzle of an inkjet device onto a base material. The first electrode ink contains at least one electrode active material in a solvent matrix. The second electrode ink contains at least one binder material in a solvent matrix.

DESCRIPTION OF THE DRAWING

To further illustrate the invention disclosed herein, the specification refers to the following drawing figures in which.

DETAILED DESCRIPTION

Disclosed herein is an electrode having a collector and an electrode active material layer formed on the surface of the collector. The electrode active material layer and contains electrode active material particles and a surfactant formed on the surface of the collector.

Also disclosed herein is an electrode manufacturing method comprising the steps of fabricating at least one electrode ink composition containing electrode active material particles; depositing the electrode ink composition onto the surface of a substrate such as a base material or collector using an inkjet device to form a film; and drying the deposited film. The first electrode ink contains an electrode active material alone or in combination with an electroconductive agent. The method also includes depositing a second electrode ink composition containing a binder material onto the substrate from the inkjet device.

Also contemplated is method utilizing an inkjet system to provide an electrode with a catalyst film layer of highly uniform film thickness. Disclosed herein is a method in which an electrode ink containing an electrode active material, a conductive agent, and a binder that constitute an electrode catalyst layer (will be referred to simply as "catalyst layer," hereinafter) is sprayed from an inkjet system to form the catalyst layer.

The electrode ink composition disclosed herein can have a viscosity suitable for ejection or administration from an inkjet system. It is contemplated that the electrode ink composition employed can be a low-density ink compatible with administration from an inkjet system. For example, densities of 100 cP or lower are contemplated in certain applications.

Figure 1:
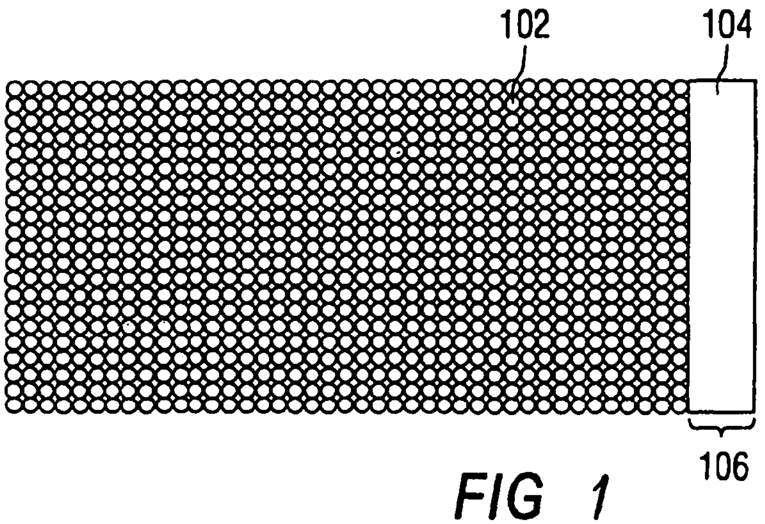
FIG. 1 is a schematic diagram of an embodiment of an electrode fabricated using an inkjet system according to a method as disclosed herein.

FIG. 1 is a schematic diagram of an embodiment of the electrode formed using an inkjet system enlarged for purposes of discussion. FIG. 1 depicts an electrode in which catalyst layer 102 formed using the inkjet system is layered on top of collector 104. It is to be understood that, although catalyst layer 102 is illustrated as if it were configured with many particles in order to show the adhesion points where individual droplets of particulate material in catalyst layer 102 adhere, catalyst layer 102 can be recognized as a single layer by the naked eye.

Typically the electrodes are sealed inside a casing material with a positive electrode tab and a negative electrode tab leading outside the casing material. An unlayered portion 106 of the catalyst layer 102 (hereinafter described as "uncoated part") may be provided on collector 104 when catalyst layer 102 is layered on top of collector 104 in order to connect the tabs to collector 104. The uncoated or unlayered portion may be provided for purposes other than for connecting the tabs as desired or required provided that the energy density of the resulting battery is not unduly compromised.

In previous electrode formation methods, a coater such as a roller type coater was used to form the catalyst layer. In such methods, it was impossible to form a very thin, highly uniform catalyst layer. In order to insure that the resulting electrode has a consistent coating layer essentially free of voids coating of a minimum thickness must be applied using the roller coater. Additionally, while a coating of uniform thickness is desirable, when the catalyst layer is formed using a conventional coater, the film tends to become thicker at the edge portion of the coated substrate. That is, the film tends to become thicker at the boundary between the part where the film is formed and the part where the film is not formed.

It has been found, that use of an inkjet system as an applicator for the coating material permits development of a thin uniform catalyst layer. As used herein the term inkjet system refers to a printing system in which a liquid-form ink is sprayed through a nozzle so as to adhere the ink to a target object. Inkjet systems can be classified into a piezo system, a thermal inkjet system, or a bubblejet system depending on how the ink is sprayed.

The piezoelectric system is a system in which the ink is sprayed from a nozzle by means of deformation of a piezoelectric element provided in an ink chamber containing ink that changes its shape as current is applied to it. The thermal inkjet system is a system in which the electrode ink is heated using a heater, and the ink is sprayed by energy generated when vaporized ink explodes. Like the thermal inkjet method, the bubblejet (registered trademark) system is a system in which the ink is sprayed using the energy generated when vaporized ink explodes. Although the sites to be heated differ between the thermal inkjet system and the bubblejet (registered trademark) system, their basic principle is the same.

Application of electrode ink utilizing a jetting device such as an inkjet system can result in enhanced uniformity in film formation. Uniform film formation can promote uniform heat dissipation which can reduce or minimize localized electrode degradation. It is contemplated that manufacturing methods disclosed herein can employ a single inkjet line. The deposition pattern for the electrode ink can be precisely controlled and readily changed and modified using a computer or similar controller. Thus multiple electrodes can be fabricated using a single inkjet line. Multiple inkjet lines may be provided to handle mass production.

It is also contemplated that a battery with a catalyst layer fabricated using an inkjet system as disclosed herein exhibits a high level of resistance to vibration. A battery with the catalyst layer fabricated using the manufacturing method as disclosed herein can be used in applications involving vibration as could occur in a vehicle.

Without being bound to any theory, it is believed that the high level of resistance to vibration may be attributable to the film uniformity and the microstructure of the catalyst layer fabricated using the inkjet system. When the film is highly uniform, resonance attributed to the distribution of thickness can be reduced.

Figure 2A:
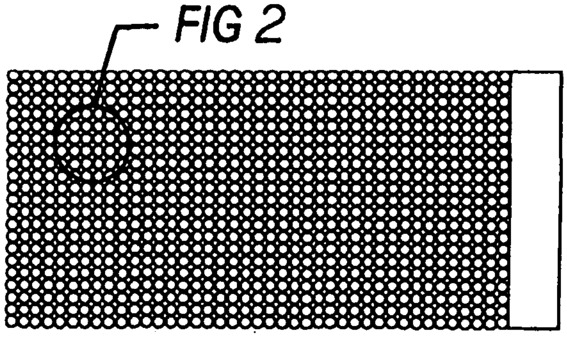
FIGS. 2A through 2C are schematic diagrams of the microstructure of an electrode fabricated using an inkjet system according to a method as disclosed herein.
Figure 2B:
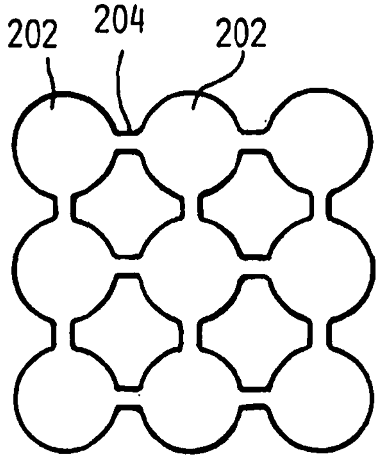
Figure 2C:
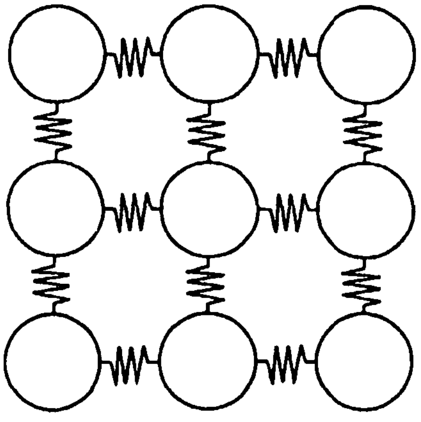

In addition, as shown in FIG. 2, the catalyst layer fabricated using the inkjet system is configured with many discrete dots 202 created by the adhered electrode ink. Dots 202 create a structure in which they are connected together by means of surface tension at the interfaces with adjoining dots 202. In such a microstructure, the dots 202 function as masses, and parts 204 connected by means of surface tension function as springs, demonstrating the function of the "mass-spring model" illustrated. Without being bound to any theory, it is theorized that vibration resistance may be enhanced by the function of the mass-spring model illustrated. However, the technical scope of the present invention should be determined based on the claims. Even if a different mechanism increases the resistance to vibration, it does not fall outside the technical scope of the present invention.

It is also believed that the energy density of the battery can be improved by the use of a thin catalyst layer. Where high-output is required, as is the case with the power supply for a vehicle, an assembled battery can be configured by connecting many batteries. An assembled battery or stack with a fixed output can be quite large. A thin catalyst layer can contribute significantly to size reduction of the assembled battery. As far as a vehicle is concerned, the mass of the vehicle is limited, and reducing the weight of the assembled battery can advantageously affect the fuel economy of the associated vehicle.

Because the catalyst layer as disclosed herein contains an active material, a conductive agent, and a binder, the active material, the conductive agent, and the binder need to be sprayed using the inkjet system when fabricating the catalyst layer. In one embodiment contemplated herein, instead of using an ink formulation that contains an active material, a conductive agent, and a binder, a dual or multiple ink system is applied. In such a fabrication method, a first ink which containing an active material and a conductive agent and a second ink containing a binder are prepared. The first and second inks are sprayed through separate nozzles. This process can allow high-concentration inks to be used in order to improve the workability and to reduce material costs.

Figure 3:
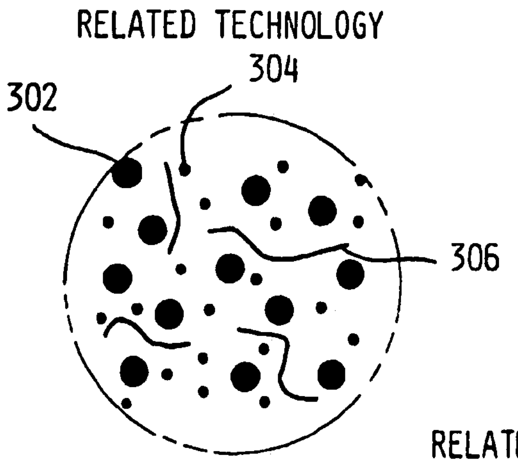
FIG. 3 is a diagram of an electrode ink composition containing an active material, a conductive agent, and a binder in a solvent.
Figure 4:
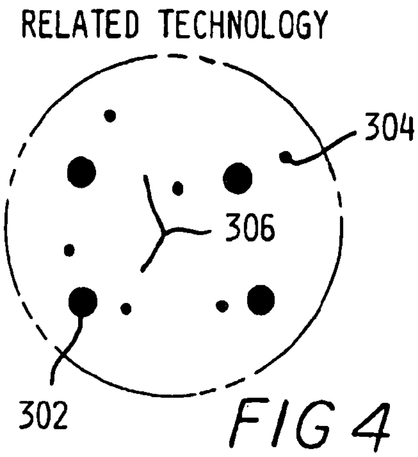
FIG. 4 is a diagram of an electrode ink composition with a high solvent content containing an active material, a conductive agent, and a binder.
Figure 5:
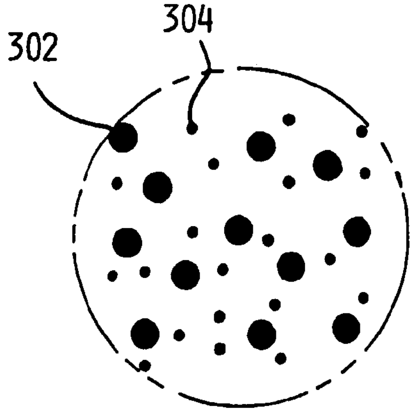
FIG. 5 is a diagram of an electrode ink composition containing an active material and a conductive agent in a solvent.
Figure 6:
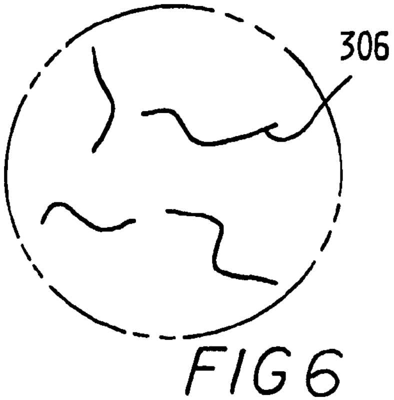
FIG. 6 is a diagram of an electrode ink composition containing a binder in a solvent.

The embodiment of the method as disclosed herein will be explained in reference to FIGS. 3-6. FIG. 3 is a conceptual diagram of an ink containing an active material, a conductive agent, and a binder in a solvent matrix. FIG. 4 is a conceptual diagram of an ink containing an active material, a conductive agent, and a binder along with a high solvent content matrix. FIG. 5 is a conceptual diagram of an ink containing an active material and a conductive agent in a solvent matrix. FIG. 6 is a conceptual diagram of an ink containing a binder in a solvent matrix.

As shown in FIG. 3, when an ink containing active material 302, conductive agent 304, and binder 306 in a solvent matrix is employed, binder 306 entwines with active material 302 and conductive agent 304 increasing the viscosity of the ink. Because ink jet nozzles can become clogged if high viscosity inks are sprayed using an inkjet system, reduced viscosity inks can be advantageously employed. As shown in FIG. 4, the proportion of solvent can be increased, and the concentrations of active material 302, conductive agent 304, and binder 306 decreased.

In the present embodiment as disclosed herein, a first ink as depicted in FIG. 5, containing active material 302 and conductive agent 304 but without binder material, and a second ink as depicted in FIG. 6, containing binder 306 without any active material or conductive agent, are prepared. The respective ink formulations are sprayed using an inkjet system to form a catalyst layer. The concept is similar to formation of a two-color image using an inkjet printer. As shown in FIGS. 5 and 6, when the first ink and the second ink are prepared separately, their viscosities can be kept relatively low even if the concentrations of the active material, the conductive agent, and the binder are high, so that high-concentration inks can be used. Thus, the quantities or concentrations of the active material, the conductive agent, and the binder supplied by each spray can increase, so that the number of times or passes needed to form the catalyst layer can be reduced. Additionally reduction of the quantity of the solvent used can result in reduction of material cost.

The present embodiment of the method disclosed herein can provide a battery that exhibits improved performance/ Without being bound to any theory, it is believed that when the active material and the binder are mixed in the ink in advance, the binder tends to partially cover the surface of the active material, reducing the effective area of the active material. When a second ink which contains the binder is supplied separately, covering by the binder can be minimized, and the battery characteristics can be improved when the active material is utilized.

An embodiment of the manufacturing method disclosed herein will be explained in the order corresponding to the following steps. A suitable catalyst layer can be prepared on a suitable base material member. The base material member can be suitable substrate including but not limited to a collector or a macromolecular electrolyte film. Generally, the collector can have a thickness between 5-20 μm. It is also contemplated that a collector with a thickness outside this range may be used also.

Before an electrode ink is sprayed onto the base material using the inkjet system, the positive electrode ink or a negative electrode ink is prepared. When a positive electrode catalyst layer and a negative electrode catalyst layer are both to be formed using the inkjet system, both a positive electrode ink and a negative electrode ink are prepared. When a macromolecular electrolyte film is also to be formed using the inkjet system, an electrolyte ink is also prepared.

A first ink suitable for preparation of a positive electrode can contain a positive electrode active material. It is also contemplated that the first ink may also contain materials including but not limited to a conductive material, a disperser, and a solvent. These catalyst layer constituent materials are not subject to any particular restrictions. For example, when the electrode is used as an electrode of a lithium battery, non-limiting examples of positive electrode active materials include Li—Mn oxide compounds, such as $LiMn_2O_4$, and a Li—Ni oxide compounds, such as $LiNiO_2$. In some cases, two or more positive electrode active materials may be used in combination. Non-limiting examples of conductive materials include carbon black, furnace black, channel black, and graphite.

Where desired or required, a dispersant may be used in order to prevent aggregation of the positive electrode active material and the conductive material. A compound with a dispersive function may be successfully employed. Non-limiting examples of suitable materials include polyoxystearylamine, glycerin fatty acid ester, polyoxyethylene alkylamine, and hydroxyalkyl monoethanolamine. When employed, these elements are added to a solvent matrix with vigorous agitation.

Although the solvent is not subject to any particular restriction, N-methyl pyrrolidone (NMP) and acetonitrile are considered to be non-limiting examples.

The second electrode ink composition employed in preparing the positive electrode can contain at least one binder material and a solvent. Non-limiting examples of suitable binder materials include at least one of polyvinylidene fluoride (PVdF) and a complex of polyvinylidene fluoride and hexafluoropropylene (HFP). Although the solvent is not subject to any particular restriction, as in the first electrode ink composition, at least one of N-methyl pyrrolidone (NMP) and acetonitrile are considered non-limiting examples.

The mixing ratio of the compounds contained in each positive electrode ink composition is not subject to any particular restriction. The viscosity of the resulting respective positive electrode ink composition should be low enough to facilitate application by an inkjet system. The concentration of the compounds contained in the each positive electrode ink composition can be as high as possible in terms of improved performance. It is also contemplated that the viscosity of the electrode ink composition can be regulated by regulating the temperature of the electrode ink composition; with increases in composition temperature resulting in decreases in composition viscosity. Where desired or required, it is also contemplated the electrode ink composition can include suitable viscosity modifiers.

The first negative electrode ink composition suitable for preparing a negative electrode as disclosed herein can include at least one negative electrode active material in a solvent matrix. The first negative electrode ink can also include other suitable components. Non-limiting examples of these materials include conductive materials, dispersants, and the like.

The constituent materials of the first negative electrode active material are not subject to any particular restriction. When the electrode is used as a negative electrode of a lithium battery, it is contemplated materials such as crystalline carbon materials and noncrystalline carbon materials may be employed. Non-limiting examples of suitable materials that can be employed as the negative electrode active material in the first negative electrode ink composition can include natural graphite, carbon black, activated carbon, carbon fibers, coke, soft carbon, and hard carbon. Where desired or required, two or more negative electrode active materials may be used in combination It is also contemplated that materials such as carbon black, furnace black, channel black, and graphite may be included as conductive agents. A dispersant may be employed as desired or required to prevent aggregation of the negative electrode active material(s) and/or the conductive material. Suitable dispersants include, but are not limited to, materials such as a polyoxy stearylamine, glycerin fatty acid esters, polyoxyethylene alkylamine, and hydroxyalkyl monoethanolamine.

The various components of the negative electrode ink can be are added to a solvent matrix with vigorous agitation. Although the solvent is not subject to any particular restriction, N-methyl pyrrolidone (NMP) and acetonitrile are non-limiting examples of solvents that can be employed as the solvent matrix in the negative electrode ink composition disclosed herein.

The second negative electrode ink composition contains suitable binder material or materials. In the embodiment as disclosed herein, the second negative electrode ink composition can be composed of at least one binder material contained in a solvent matrix. It is contemplated that the binder may be any suitable compound or compounds with non-limiting examples of such materials including polyvinylidene fluoride (PVdF), complexes of polyvinylidene fluoride and hexafluoropropylene (HFP), and styrene butadiene rubbers. The solvent employed in the solvent matrix may be any material suitable for use in an inkjet system. Non-limiting examples of suitable solvents include at least one of N-methyl pyrrolidone (NMP) and acetonitrile.

The mixing ratio of the components contained in each negative electrode ink composition is not subject to any particular restriction. It is contemplated that the resulting negative electrode ink composition will have the viscosity low enough to be applied using an inkjet system. It is desirable that the concentration of the various components be as high as possible in terms of improved performance and efficiency. It is also contemplated that the viscosity of the negative electrode ink can be controlled by various methods including but not limited to increasing the temperature of the ink as well as adding various viscosity modifiers as desired or required.

The viscosity of each respective ink supplied to an inkjet system may be that suitable for efficient application. Non-limiting examples of suitable viscosity is between 10-100 cP.

Once the respective inks are prepared, the inks are sprayed onto the base material using an inkjet system to form the catalyst layer. In the present embodiment of the method as disclosed herein the electrode inks dispensed through the inkjet system include a first ink containing at least one active material and at least one conductive material, and a second ink containing at least one binder.

It is contemplated that the inkjet system employed will dispense minute discrete droplets of essentially equal volumes onto the substrate surface. The volume of ink composition sprayed or ejected from a given nozzle or nozzles of the inkjet device with each ejection cycle is very small, and approximately identical volumes can be ejected. The film formed when the electrode ink composition is ejected and adhered is very thin and uniform. When an inkjet system is employed, the thickness, contour and pattern of the deposited film can be controlled precisely. The resulting catalyst layer formed through adhesion to the electrode is very thin and uniform. In addition, when the inkjet system is used, the thickness and the shape of the catalyst layer can be controlled precisely. Furthermore, when an inkjet system is utilized, a film with a desired shape and contour can be formed by designing a specific pattern on a computer and printing it. If the film layer as initially applied is too thin, two or more rounds of the appropriate electrode ink composition can be applied to the same surface. That is, the same electrode ink can be printed over the same collector. As a result, a film with a desired thickness can be formed.

It is contemplated that that the volume of the electrode active particles sprayed from the inkjet device are the range of 1-100 μL. The size of the particles can be that sufficient to reduce vibration in the resulting electrode. It is contemplated that the volume of the particles dispensed using the inkjet device will be roughly uniform, so that the electrodes and the battery manufactured are highly uniform.

The inkjet system as disclosed herein can be used to achieve a catalyst layer of a desired thickness. In order to achieve the desired thickness, it is contemplated that the inkjet system can make one or more passes over the desired area or region. It is contemplated that the thickness can be corrected or adjusted during the fabrication process. Thus, if a catalyst layer is too thin after an initial application pass, two or more rounds of ejection can be applied to the same surface. That is, the same electrode ink composition ink can be applied repeatedly on the same base material to permit a catalyst layer with a desired thickness to be formed. When the inkjet system is used to form the catalyst layer in the manner as disclosed herein, the catalyst layer formed is highly homogenous, so that a high level of layer uniformity can be maintained even if multiple layers are applied.

In forming the respective electrodes, the first electrode ink composition and the second electrode ink composition can be applied simultaneously or in any sequence as desired or required. It is also contemplated that the first electrode ink and the second electrode ink composition may be ejected or sprayed a different number of times in order to control the mixing ratio of the constituent materials. For example, when the first ink composition and the second ink composition may be supplied at a ratio of 2:1. In that situation, the number of rounds the second ink composition is sprayed would be half that of the first ink composition.

Once the catalyst layer is formed, the solvent can be removed and the resulting electrode used or subjected to any post processing steps as desired or required. While it is contemplated that the catalyst layer thus formed may be of any suitable thickness, when the method as disclosed herein is employed, it is possible to achieve a very thin catalyst layer, with thicknesses as thin as between 5-15 μm being possible. Greater thicknesses are also contemplated.

The catalyst layer formed on an electrode fabricated using the manufacturing method disclosed herein can produce an electrode suitable for use in a battery. The battery contemplated herein may include at least one of a positive electrode having the catalyst layer disclosed herein or negative electrode having a catalyst layer disclosed herein. It is contemplated that, in certain situations, both the positive electrode and the negative electrode will have catalyst layers fabricated using the manufacturing method disclosed herein.

The battery according to an embodiment as disclosed herein can include a positive electrode, a catalyst, and a negative electrode are arranged in that order and sealed in a suitable casing material. The positive electrode and the negative electrode have a structure in which the catalyst layer is provided on the surface of a collector. The battery includes a suitable electrolyte that may be solid or liquid. In consideration of its use in a vehicle, the electrolyte may be a gel or solid. In automotive applications, the battery may advantageously be a lithium secondary battery.

It is contemplated that batteries as disclosed herein may be connected in series or parallel, or in a combination of series and parallel, to configure an assembled battery. For example, the assembled battery can be mounted inside a packaging case with terminals leading out of the packaging case and used for connection to other devices. Furthermore, it is contemplated that several assembled batteries may be connected in series or parallel, or in a combination of series and parallel, to configure the complex assembled battery.

The number of batteries in the assembled battery or the complex assembled battery and how they are connected should be determined according to the expected output and capacity of the battery. When an assembled battery or a complex assembled battery as disclosed herein is configured, the stability as a battery increases over that of a plain battery. It is also contemplated that the assembled battery or complex battery configuration can mitigate the negative effects of one bad cell on the entire assembly.

The assembled battery or the complex assembled battery can used to provide power for vehicle. The assembled battery or the complex assembled battery to be installed in a vehicle has the characteristics explained above. It is contemplated that the battery and/or battery assembly according to the embodiment disclosed herein will exhibit improved durability and sufficient and consistent output over a long period of time. In addition, because the volume the battery occupies is small, the available space in the vehicle can be increased. For example, it is contemplated that a bipolar battery configured having a macromolecular electrolyte layer electrodes prepared according to the processed discussed herein can include a collector that is 5 μm thick, a positive electrode layer that is 5 μm thick, a solid electrolyte layer that is 5 μm thick, a negative layer that is 5 μm thick. Thus an individual battery element can be 20 μm thick. If a bipolar battery with an output of 420 V is fabricated by layering 100 such battery units, 0.5 L of battery volume provides an output of 25 kW and 70 Wh. It can be appreciated that this is roughly the same output as that of a conventional battery. However the battery as disclosed herein is 1/10th the size or smaller.

Example 1

A first electrode ink composition was prepared according to the method outlined herein Eighty-five grams of spinel manganese with a grain size of 1 μm as a positive electrode material, 10 g of carbon black with a grain size of 50 nm as a conductive agent, and 5 g of polyoxystearylamine as a dispersant were measured and admixed. One hundred forty grams of NMP was added and dispersed as a solvent to achieve a composition viscosity of 100 cP.

A second electrode ink was prepared according to the method outlined herein. Five grams of PVdF as a binder was measured, and 10 grams of NMP was added to achieve a viscosity of 100 cP.

In order to form the catalyst layer, the first electrode ink composition containing positive electrode material and the second electrode ink composition containing binder material were sprayed onto aluminum foil from an inkjet device to form a catalyst layer. Fifty-one rounds of spraying were required before a specified weight per unit area was achieved. The results are shown in Table 1.

Comparative Example 1

A positive electrode ink composition was formed using 80 g of spinel manganese with a grain size of 1 μm as a positive electrode material, 10 g of carbon black with a grain size of 50 nm as a conductive agent, 5 g of PVdF as a binder, and 5 g of polyoxystearylamine as a dispersant. The respective materials were measured and admixed with 640 g NMP to achieve a viscosity of 100 cP.

In order to form a catalyst layer, the fabricated positive electrode ink composition was sprayed onto aluminum foil using the inkjet device used in Example 1 to form a catalyst layer. One hundred sixty-seven rounds of spraying were required before a specified weight per unit area was achieved. The results are shown in Table 1.

TABLE 1

| | Number of Inkjet Passes | Quantity of solvent used |
|---|---|---|
| Example 1 | 51 rounds | 150 g |
| Comparative Example 1 | 167 rounds | 640 g |

In the Comparative Example 1, 13% of the positive electrode ink composition consists of solids. In contrast in Example 1, 40% of the first electrode ink composition containing the electrode active material consists of solids, and 33% of the second electrode active ink composition containing the binder consists of solids. Thus, the concentration of solids in the Example embodying the disclosure herein is approximately 3 times that of the Comparative example with the number of composition application rounds reduced accordingly to slightly less than 1/3. In addition, the quantity of solvent used was reduced to slightly less than 1/4, and the cost of the solvent, the time required for drying, and the energy were reduced accordingly.

As can be appreciated from the foregoing Example and disclosure herein, when the electrode ink compositions containing the active material and the conductive agent and the electrode ink composition containing the binder are fabricated and applied separately, the quantity of solvent used, and the number of application rounds can be reduced. Thus it can be appreciated that the catalyst layer can be fabricated inexpensively and stably using an inkjet device.

In an alternate embodiment as disclosed herein, it has been unexpectedly found that the use of a surfactant as a binder in the electrode as disclosed herein can improve the binding property in the catalyst or active material layer. In addition, it is believed that the distribution of the electrode active material in the active material layer can be rendered more uniform by utilizing the composition disclosed herein.

In certain situations, conventional binders such as PVdF can result in electrodes with insufficient properties to bind the active material layer of the electrode to the collector in a uniform manner. The present disclosure is predicated, at least in part, on the unexpected discovery that an electrode ink containing a surfactant in combination with the electrode-active material produces improved bonding and coating characteristics in the resulting collector and associated electrode. It has been found that employing a surfactant as a binder produces enhanced bonding and/or film forming characteristics in the electrodes, and provides resulting batteries that have enhanced performance characteristics.

The mechanism for improvement of the binding and the composition uniformity in the active material layer of the electrode when a surfactant is used as a binder is not clear. However, a surfactant has both a hydrophilic functional group and a lipophilic functional group, and it is believed that the binding property of the active material layer is improved since the functional groups present in the surfactant form many points for bonding to fine holes present in the active material, demonstrating anchor effect. In addition, because the surfactant has both a hydrophilic functional group and a lipophilic functional group, it exhibits affinity for most of the components contained in the active material layer. It is believed that the use of the surfactant permits the respective components in the active material layer to be dispersed more uniformly, and that the uniformity of the composition of the resulting active material layer can be improved.

The electrode as disclosed in this alternate embodiment includes a collector and an active material layer formed on the surface of the collector.

The collector is configured using a conductive material. Nonlimiting examples of conductive materials include aluminum foil, copper foil, or stainless steel (SUS) foil. In general, the thickness of the collector is 10-50 μm. However, it is contemplated that a collector with a thickness out of said range may be successfully utilized depending on factors including but not limited to the contemplated usage of the electrode. The size of the collector is determined according to the usage of the electrode. If a large electrode for a large battery is to be fabricated, a collector with a large area can be used. If a small electrode is to be fabricated, a collector with a small area can be used.

The active material layer formed on the surface of the collector contains active material particles. Non-limiting examples of active material particles suitable for use as positive electrode-active materials include Li—Mn oxide compounds such as $LiMnO_2$ and $LiMn_2O_4$, Li—Ni oxide components such as $LiNiO_2$, and Li—Co oxides such as $LiCoO_2$. Of these, Li—Mn oxides, Li—Ni oxides, or a mixture thereof that allows the charging status to be detected by measuring the voltage is can be desirable. It is also contemplated that two or more positive electrode active materials may be used simultaneously.

Carbon materials such as crystalline carbon materials and non-crystalline carbon materials are non-limiting examples of negative electrode active materials. More specifically, graphite system carbon materials such as natural graphite and artificial graphite, carbon black, activated carbon, carbon fibers, coke, soft carbon, and hard carbon can be employed. When such a carbon material is adopted for the negative electrode material, the reliability of the battery can be improved in certain situations.

The active material particles may be of any suitable grain size, with average grain size between 0.01 and 3 μm being typical, and average grain size between 0.05 and 1 μm; and average grain size between 0.1 and 0.8 μm being useful in certain applications. The average grain size employed will be one large enough to provide suitable balance with the surfactant to provide binding properties. The average grain size will be sufficiently small to permit precise application such as would occur with a precision ejection system such as an inkjet. Additionally, the average grain size of the active material particles should be small enough to maintain dispersion of the active material particles in the electrode ink The active material layer of the electrode disclosed herein also contains a surfactant. As disclosed herein, "surfactant" means a compound having both a hydrophilic functional group and a lipophilic functional group within the molecule. The surfactant employed is capable of functioning as a binder in the active material layer. It is contemplated that the surfactant may be composed of one or more compounds as desired or required. Depending on its ionization condition, the surfactant employed can be classified as a cationic surfactant, an anionic surfactant, an amphoteric surfactant, or a nonionic surfactant.

Cationic surfactants are broadly defined as surfactants that release anions through ionization in water for positive charging. Cationic surfactants are highly stable with respect to strong acids, and exhibit excellent adsorption on the surface of negatively charged materials. Thus it is contemplated that cationic surfactant compound(s) may be employed in an active material layer containing negatively charged active material particles on the surface. Tertiary and quaternary ammonium salts are nonlimiting examples of cationic surfactants. Of these, lauryl methylammonium chloride ($C_{12}H_{25}N(CH_3)_3Cl$) can be employed as because it mixes well with other elements in the active material layer and exhibits excellent stability.

Anionic surfactants are broadly defined as surfactants that release cations through ionization in water for negative charging. Anionic surfactants can be applied to a very wide range of materials. Anionic surfactants exhibit excellent adsorption on the surface of a positively charged material. Thus it is contemplated that anionic surfactant material(s) may be employed in an active material layer containing positively charged active material particles on the surface of a suitable collector. Examples of anionic surfactants include but are not limited to aromatic sulfonic formalin condensates and specified carboxylic system macromolecular surfactants. Of these, sodium salts of naphthalenesulfonate formalin condensate or sodium salts of specific aromatic sulfonic formalin condensates are contemplated. Suitable materials will mix well with other components in the active material layer and exhibit excellent stability.

Amphoteric surfactants are surfactants that create both positively charged parts and negatively charged parts in the molecules through ionization in water. An amphoteric surfactant may demonstrate the characteristics of either a cationic surfactant or an anionic surfactant depending on the pH of the solution in which it is dissolved. More specifically, such surfactants exhibit cationic surfactant characteristics in a solution with low (acidic) pH, and anionic surfactant characteristics in a solution with high (alkaline) pH. Nonlimiting examples include 2-alkyl-N-carboxymethyl-N-hydroxyethyl imidazolinium betaine, lauryldimethylaminoacetic betaine, and alkyl di(aminoethyl)glycine hydrochloride solution.

Nonionic surfactants are surfactants that do not ionize in water. Because nonionic surfactants are not affected by acids, alkalis, or mineral salts, they exhibit excellent compatibility with water, various other surfactants, and various aqueous systems and nonaqueous systems. Furthermore, because nonionic surfactants do not ionize, they absorb on other components in the active material layer primarily by molecular attraction and interaction. Nonlimiting examples of suitable nonionic surfactants include polyoxyethylene ether type nonionic surfactants ("ether type surfactant," hereinafter) exhibit excellent solubility in nonaqueous systems.

Ether type surfactants typically have relatively long functional groups (for example, alkyl groups, alkylene groups, etc.). Without being bound to any theory, it is believed that the functional groups can interact with surface topography and lattice structure of the components (for example, active substances) in the active material resulting in improved binding properties. Thus it is hypothesized that, when a substance capable of binding and releasing lithium ions is contained as an active substance, as would occur when the electrode as disclosed herein is adopted for a lithium battery, an ether type surfactant having long functional chains added to the active material layer interacts with and or bonds to the nano-order size holes in the topography and/or lattice structure that facilitate the binding and release of the lithium ions.

Nonlimiting examples of nonionic ether-type surfactants include polyoxyethylene ether surfactants such as polyoxyethylene alkyl ethers, polyoxyethylene alkylene ethers. Ether type surfactants such as polyoxyethylene octyl phenyl ether, polyoxyethylene stearyl ether, or polyoxyethylene cetyl ether may be used.

Suitable polyoxyethylene ether surfactants can be those in which the molar quantity of ethylene oxide added in the polyoxyethylene system ether surfactant is 1-50 mol; with molar quantities 1-20 mol being typical in certain situations. It is believed that such surfactants will provide a balance between the size of the surfactant and the surface shape of the respective elements (for example, active substance) in the active material that enhances the binding property of the active material. It is contemplated that when multiple polyoxyethylene ether surfactants with different molar quantities of added ethylene oxide are contained, the arithmetic average molar quantity of the various polyoxyethylene ether surfactants can be utilized and that the arithmetic average will fall within the desired range. Thus, a surfactant of a size out of the aforementioned range may be used.

Where desired or required, the hydrophilic and lipophilic properties of the surfactant added to the active material layer may be controlled depending on the degree of hydrophilic and lipophilic properties of the surfaces of the various materials (active substances) contained in the active material layer. More specifically, the HLB (Hydrophilic-Lipophilic Balance) value should be controlled. The surfactant as disclosed herein can have any suitable HLB value. Nonlimiting examples of suitable HLB values include those in ranges such as 5-30, or 10-20. It is contemplated that when two or more surfactants are contained in the active material layer, the HLB value of the surfactant component is obtained by computing the weighted average of the volumes of the respective surfactants. Thus surfactants having HLB values outside the exemplary ranges can be employed.

In the case of the active material layer of the electrode as disclosed herein, the contents of the active material particles and the surfactant may be adjusted to suit a desirable battery performance. As a non-limiting example, that the content of the active material particles with respect to the total quantity of the active material layer may be in the range of 90-99.95 wt %, with ranges between, 95-99.9 wt % being contemplated in certain situations. The maximum concentration of the active material particles can be governed by the strength of the active material layer desired or required. It is desirable that the concentration of the surfactant relative to the total quantity of the active material layer be 0.05-10 wt %, with surfactant concentrations in the range of, 0.1-5 wt % being contemplated in certain situations. It is contemplated that the lower surfactant concentration limit being that capable of achieving binding properties in the active material layer. While the ratio between the concentration of the active material particles and the surfactant is not subject to any particular restriction, it is desirable that if the content of the active material particles in the active material layer is considered to be 100 wt %, the content of the surfactant is 0.05-20 wt %, or preferably, 0.1-10 wt %.

The active material layer may contain other materials as needed. Nonlimiting examples of other materials or additives include: macromolecular electrolytes, conductance aids, lithium salts as supporting electrolytes, and polymerization initiators Suitable macromolecular electrolytes can be those that exhibit high ionic conductance. Non-limiting examples include polyethylene oxide (PEO) polymers and polypropylene oxide (PPO) polymers.

Macromolecular electrolytes of choice may have a cross-linked or cross-linking structure. If a macromolecular electrolyte with a cross-linking structure is to be included in the active material layer, a polymerization initiator can be added to a macromolecular electrolyte raw material at the time of formation of the active material layer with polymerization occurring after the active material layer is formed in order to create a macromolecular electrolyte with a cross-linked structure. Where desired or required, the macromolecular electrolyte contained in the active material layer may be identical to macromolecular electrolyte material used as the electrolyte in the electrolyte layer of the battery in which the electrode as disclosed herein is positioned.

As used herein "conductance aid" is taken to mean a substance to be admixed in order to improve the conductance in the active material layer of the electrode. Acetylene black, carbon black, graphite, carbon fibers of various kinds, and carbon nano tubes are nonlimiting examples of conductance aids.

At least one of lithium bis(perfluoro-ethylenesulfonyl) imide; $Li(C_2F_5SO_2)_2N$, $LiPF_6$, $LiBF_4$, $LiClO_4$, $LiAsF_6$, and $LiCF_3SO_3$ are nonlimiting examples of lithium salts that can be used as supporting electrolytes.

Suitable polymerization initiators can be utilized to act upon the cross-linking groups of macromolecular electrolyte raw material in order to facilitate a cross-bridging reaction if desired or required. Examples of suitable materials can include materials classified as a photo polymerization initiators or thermal polymerization initiators. Azobisisobutyronitrile (AIBN) (for thermal polymerization) and benzyl dimethyl ketal (BDK) (for photo polymerization) are nonlimiting examples of polymerization initiators.

The content of the material of the aforementioned conductance aid separate from the active material particles and the surfactant in the active material layer is not subject to any particular restriction, and can be adjusted as needed. The conductance aid may be present in an amount of 5-50 wt % with respect to the total quantity of the active material layer.

The surfactant contained in the active material layer of the electrode as disclosed herein can function as a binder. In one embodiment, the binder component in the active material layer will be substantially free of PVdF. "Substantially free of PVdF" as used herein contemplates that the binder component may contain minor amounts of PVdF provided that the amount that PVdF present is not sufficient to demonstrate a binder function.

The active material layer on the collector may be of any suitable thickness, with thicknesses between 5 and 20 μm being typical. It is also contemplated that active material layers with thicknesses between 0.5 and 5.0 μm can be achieved and utilized in the electrode disclosed herein.

It is contemplated that the electrode disclosed herein may be prepared by any suitable method. One method particularly suited for production of electrodes having active material layers with thicknesses less than 5 μm is disclosed herein.

While an embodiment in which an inkjet system is utilized to spray an electrode ink onto the surface of a collector will be exemplified, the technical scope of the method disclosed herein is not restricted to the following embodiment. The electrode as disclosed herein can be fabricated by spraying an electrode ink containing active material particles and a surfactant onto a collector using an inkjet system to form a film, and subsequently drying the film formed on the collector. It is also contemplated that the method disclosed herein can include a step in which the electrode ink containing active material particles and surfactant is fabricated or prepared. Electrode ink fabrication contemplates addition of active material particles and surfactant to a solvent matrix. Film formation contemplated spraying the electrode ink onto the surface of a collector using a jetting device such as an inkjet system in order to form a film. The drying step contemplates drying the deposited film.

Electrode Ink Fabrication

During electrode ink fabrication, active material particles and surfactant are admixed with a solvent matrix in order to fabricate an electrode ink. As desired or required, other components including at least one of macromolecular electrolyte material, conductance aids, lithium salts (supporting electrolyte), and polymerization initiators, may be added to the electrode ink. In certain embodiments and formulations, it is contemplated that the electrode ink will be substantially free of PVdF as defined previously. However the electrode fabrication method as disclosed herein also contemplated that the electrode ink may contain quantities of PVdF in addition to the active materials particles and the surfactant.

Because the electrode ink prepared as disclosed herein contains materials that exhibit surfactant qualities, the electrode ink functions to disperse the active material particles in the matrix, addition of a dispersant can be eliminated. It is believed that an electrode ink containing surfactant as disclosed herein serves to disperse active material particles during the spraying step and can function as a binder in the completed electrode.

It has also been discovered, quite unexpectedly, that use of ether-type surfactants can minimize the generation of bubbles upon contact with active material particles potentially improving the binding property of the active material layer and the uniformity of the resulting layer composition.

The solvent employed herein may be any material compatible with the respective components. It is contemplated that various commercially available surfactants may be employed in the electrode ink and resulting electrode disclosed herein. It is also contemplated that suitable surfactants may be prepared by various methods such as methods in which a higher alcohol as the primary ingredient is subjected to a hydrogenation or polymerization reaction in the presence of precious metal fine particles. It is also contemplated that various commercially available materials can be employed. Non-limiting examples include various pyrrolidones and nitrites, of which N-methyl-2-pyrrolidone (NMP) and acetonitrile are but two examples.

The respective components in the electrode ink may be present in any suitable ratio. The quantity of active material particles present in the electrode ink is generally a quantity suitable for desired battery performance. The viscosity of the electrode ink can be any viscosity that will facilitate ready and effective application of the electrode ink to the surface of the collector. One method of application contemplated is by drop on demand or jetting with an inkjet system. It is contemplated that the viscosity of the electrode ink may be maintained by increasing the solvent content and/or by increasing the temperature of the electrode ink. The electrode ink may contain a relatively large quantity of macromolecular electrolyte material in the electrode ink. However, because the macromolecular electrolyte material may increase the viscosity of the ink, the quantity of macromolecular electrolyte material and the other compounds may be modified or controlled to maintain desired viscosity. Non-limiting examples of suitable electrode ink viscosities are those between approximately 0.01 and 0.2 Ps.

The ratio between the solids content (active material particles, surfactant, macromolecular electrolyte material, conductance aid, binder, etc.) and the solvent in the electrode ink composition is that suitable to maintain the dispersability of the respective material in the ink composition. Additionally, where desired or required, the viscosity of the electrode ink composition can be controlled to improve workability during the subsequent film formation step. In general the quantity of solids should be large enough that the number of rounds of [ink] spraying required to form the film in the film formation step is minimized to maintain the workability. The upper limit on solids concentration can be governed by the ability to disperse solids in the solvent matrix. Thus, while there is no particular restriction in terms of a specific value for the content ratio between the solids and the solvent in the electrode ink, in certain applications it is desirable to maintain the content of the solids contained in the ink with respect to the total quantity of ink in a range between 5 and 30 wt %. In certain applications, solids contents in the range of 8 and 15 wt % are desirable. Such ranges are to be considered exemplary of the ranges contemplated.

Dispersion stability considerations can also be a factor in determining surfactant content with exemplary ranges of 0.05-5 wt %, or preferably 0.1-3 wt % being contemplated. the surfactant content will typically be an amount sufficient to achieve over extended storage the dispersability of the active material particles in the ink over extended storage intervals with surfactant content maximums being determined to achieve active particle concentration sufficient to obtain suitable capacity in the resulting battery.

Film Formation

During film formation, the electrode ink is sprayed onto the surface of a collector using a suitable jetting device such as an inkjet system. The sprayed or jetted electrode ink adheres to the surface of the collector in order to form a film.

“Inkjet system” as used herein refers to a printing system in which a liquid-form ink is sprayed through a nozzle to adhere the ink to a target object. As disclosed herein, the target object is a collector. The electrode ink as disclosed herein is sprayed in particulate form onto the surface of the collector using the inkjet system in order to form a film of electrode ink. Suitable inkjet systems can include, but are not limited to, piezoelectric inkjet systems, thermal inkjet systems, or bubblejet (registered trademark) systems and the like depending on how the ink is sprayed or ejected. Suitable systems include those described previously in association with the first embodiment.

The electrode ink composition can be applied to a previously formed collector of any suitable configuration such as collectors described previously. In the alternate embodiment of the method as disclosed herein, the collector is supplied to the inkjet device capable of printing using the electrode ink. The electrode ink composition is applied using the inkjet system to adhere the electrode ink to the surface of the collector.

When applying the electrode ink, the film pattern to be formed can be determined in advance. When a system is adopted in which a film is formed based on an image generated and controlled by a computer, the design can be changed easily. Pattern decision making and film formation using a computer are widely known. The same operations are employed as those for image formation and printing using a computer and a printer.

When the electrode is to be fabricated using the inkjet system, surfactants having a high ignition point such as ether-type surfactants can be used advantageously. Ether-type surfactants that are employed can have an elevated ignition point, for example 300° C. or higher, and are stable and easy to handle in a high-temperature environment. Because vaporization of the surfactant material is minimized, drying of the ink spout and related clogging of the ink can be minimized or prevented when the electrode ink is sprayed using an inkjet system.

Drying

To accomplish drying, the solvent contained in the film of the electrode ink on the collector film is removed. As a result, the electrode is completed.

Drying may occur through any suitable process with heating being one nonlimiting example. In heating, the collector with the deposited film is subjected to an elevated temperature sufficient to volatize the solvent but low enough to maintain performance of the surfactant component.

When an electrode ink containing a polymerization initiator is employed, the method may include a suitable polymerization processing operation or operations. As such, the cross-linking groups of macromolecular material contained in the film are cross-linked to form a 3D matrix structure, and a macromolecular electrolyte is formed. When a thermal polymerization initiator is added as the polymerization initiator, thermal treatment may be adopted for the polymerization processing operation. An appropriate temperature for the thermal processing is determined in accordance with the initiator used. When the aforementioned heating step also plays the role of polymerization processing, a separate polymerization processing operation can be omitted. In certain situations the present disclosure also contemplates separate polymerization processing operation or operations. When a photo polymerization initiator is added as the polymerization initiator, light irradiation treatment may be adopted. The appropriate type or wave length of light to be employed is determined according to the initiator used. UV rays, radiation rays, and electron rays may be mentioned as light to be employed.

If necessary, a press operation may be applied to an electrode manufactured using the aforementioned method obtain better linearization of surface of the electrode can be obtained. It is contemplated that any suitable device and conditions can be employed. In addition, for an industrial process, a step in which an electrode larger than the final battery-size is fabricated and cut into a prescribed size may be adopted in order to improve the productivity.

Although the detailed explanation given here was based on an embodiment in which the electrode ink was applied using an inkjet system, other methods may be used to form the active material layer on the surface of the collector.

For example, an electrode slurry with a relatively high viscosity can be prepared by reducing the solvent content of the aforementioned electrode ink. The electrode slurry can be applied to the surface of the collector using a coater (for example; and a conventional bar coater, a self-running coater, etc.). The collector can then be heated, and subjected to polymerization processing if needed.

Also disclosed herein is a battery in which a positive electrode, an electrolyte layer, and a negative electrode are layered in that order. At least one of the positive electrode or the negative electrode is configured as previously described When the battery element is to be housed inside a case material, the battery element is housed therein while tabs are led outside the case. The case is sealed at the position where the battery element is housed in order to suitably secure the inside in an airtight manner. A macromolecular metal composite film can be used for the case. Suitable macromolecular metal composite films includes films in which at least a metal foil film and a resin film are layered together. A thin laminated battery can be fabricated using such a case.

Figure 7:
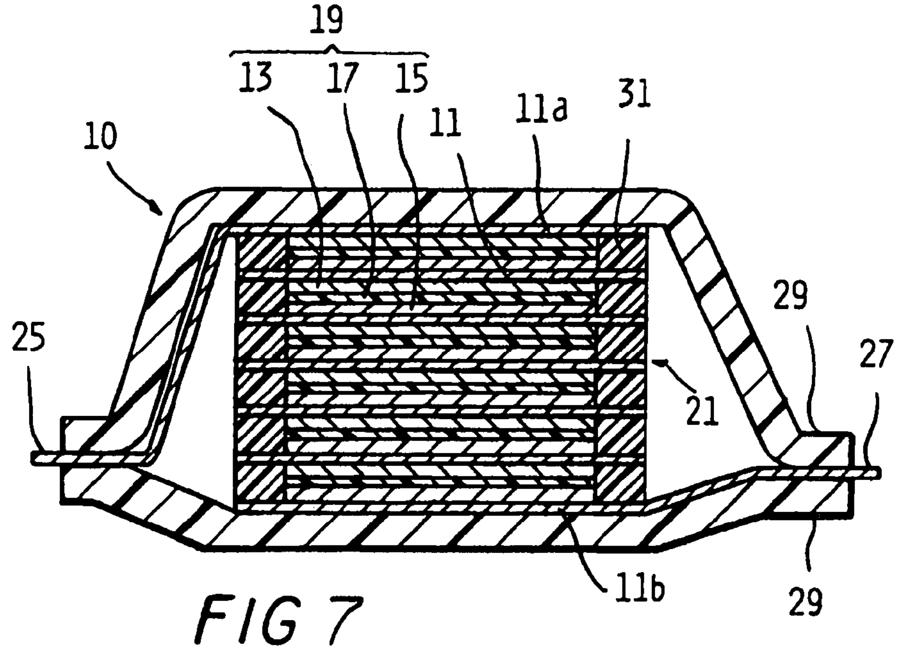
FIG. 7 is a cross-sectional view of an embodiment of a battery as disclosed herein.

In the case of a battery, a positive electrode, an electrolyte layer, and a negative electrode are layered in that order and are sealed inside a case. The electrolyte constituting the electrolyte layer may be solid or liquid. Typically in vehicular applications, a solid electrolyte can be utilized. It is also contemplated that in vehicular applications, a lithium ion secondary battery such as a bipolar type lithium ion secondary battery (bipolar battery) can be employed. When a bipolar battery is used, a battery with excellent output characteristic can be obtained. An outlined view of a bipolar battery as contemplated in this disclosure is shown in FIG. 7 for reference.

When a battery utilizing a cross-linked macromolecular electrolyte as the electrolyte is to be fabricated, it is contemplated that the electrolyte layer may be formed using an inkjet system. More specifically, the cross-linked macromolecular electrolyte can be fabricated by spraying a particulate macromolecular electrolyte material using an inkjet system. The macromolecular electrolyte can be cross-linked by means of a polymerization initiator and a polymerization reaction can be induced by the polymerization initiator such as were described previously.

Figure 8:
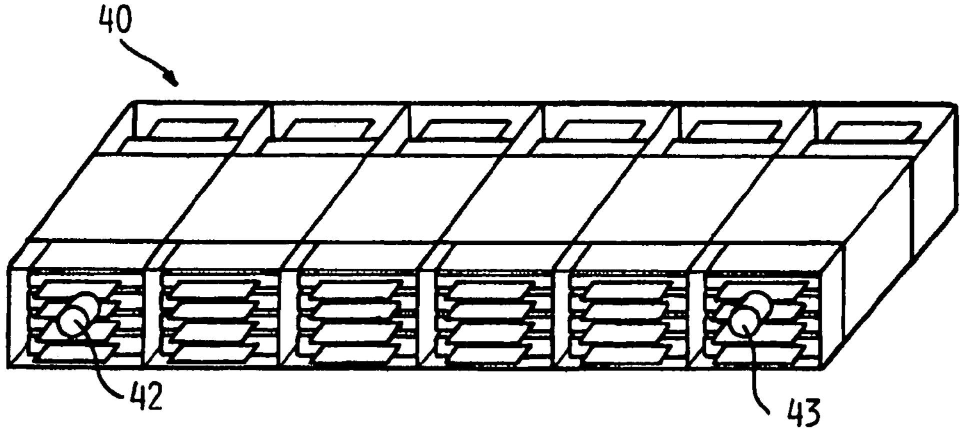
FIG. 8 is a perspective view of an assembled battery according to an embodiment as disclosed herein.

The present disclosure also contemplates an assembled battery. as depicted in FIG. 8. As shown in FIG. 8, assembled battery 40 is configured by connecting multiple units of the battery as disclosed previously. Positive electrode tabs 25 and negative electrode tabs 27 of respective batteries 10 are connected using bus bars in order to connect respective batteries 10 together. Electrode terminals (42, 43) as electrodes for entire assembled battery 40 are provided on one side surface of assembled battery 40. The multiple batteries 10 can be connected by any suitable method. For example, a technique involving ultrasonic welding or spot welding or a technique involving rivets or caulking may be adopted.

Figure 9:
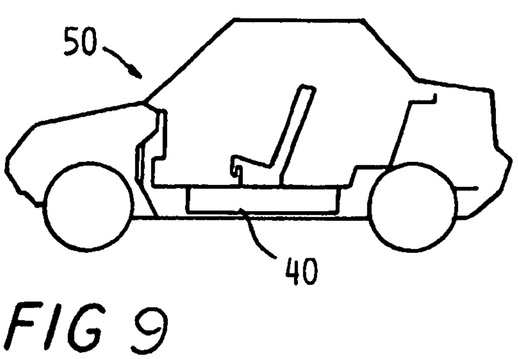
FIG. 9 is a cross-sectional view of an automobile having the battery of FIG. 8 installed therein.

The assembled battery 40 can utilize battery configurations such as those disclosed herein. The resulting battery will have a high capacity or output. In addition, because the internal resistance of each battery 10 constituting assembled battery 40 is reduced, an assembled battery with excellent output performance can be produced. Multiple batteries 10 constituting assembled battery 40 may all be connected in parallel, the multiple batteries may all be connected in series, or they may be connected using a combination of serial and parallel connections as desired or required Also disclosed herein is a vehicle employing the battery 10 or assembled batter 40 according to the alternate embodiment disclosed herein. The vehicle can have any suitable configuration and power plant. Non-limiting examples of such vehicles include fully electric automobiles that do not utilize any gasoline, hybrid automobiles such as series hybrid and parallel hybrid automobiles, as well as automobiles such as fuel-battery automobiles that use a motor to drive wheels. For reference, an outlined view of automobile 50 on which assembled battery 40 is installed is shown in FIG. 9. Assembled battery 40 to be installed on automobile 50 has the characteristics explained above. Thus, automobile 50 on which assembled battery 40 is installed has an excellent output performance.

Example 2

The battery according to the alternate embodiment as disclosed herein will be explained in further detail using examples. In the following application examples, the following materials are used as the lithium salt, positive electrode active material, and negative electrode active material unless mentioned otherwise.

Lithium salt: $LiN(SO_2C_2F_5)_2$ (will be abbreviated as "BETI," hereinafter)

Positive electrode active material: spinel type $LiMn_2O_4$

Negative electrode active material: crushed graphite (average grain size: 0.2 μm)

Furthermore, preparation of the positive electrode ink composition and the negative electrode ink composition, printing using the inkjet system, and assembly of the battery were carried out in a dry atmosphere with a dew point of −30° C. or lower.

Preparation of Positive Electrode Ink

In order to prepare a positive electrode ink composition, positive electrode active material (average grain size: 0.2 μm) (9 wt %), acetylene black (1 wt %) as a conductance aid, and polyoxyethylene distyrenated phenyl ether as an ether-type surfactant (ethylene oxide addition molar quantity: approximately 5-8 mol) (referred to as "surfactant A," hereinafter) (0.1 wt %) were admixed. N-methyl-2-pyrrolidone (NMP) (89.9 wt %) was added to the admixture as a solvent. After vigorous agitation, the resulting composition was left alone for several hours and put through a filter in order to prepare a positive electrode ink composition. The viscosity of this ink was approximately 0.5 Ps.

Preparation of Negative Electrode Ink

Negative electrode active material (average grain size: 0.2 μm) (9 wt %) and surfactant A (0.1 wt %) were admixed. NMP (90.9 wt %) was added to the admixture as a solvent. After vigorous agitation, the resulting composition was left alone for several hours and filtered in order to prepare a negative electrode ink. The viscosity of this ink was approximately 0.3 Ps.

Fabrication of Electrodes

Electrodes (positive electrode and negative electrode) were created using the electrode ink compositions prepared above and a commercially available inkjet printer according to the following procedure. The inkjet printer was controlled using a commercially available computer and software. The positive electrode ink composition and the negative electrode ink composition prepared above were used to fabricate a positive electrode active material layer and a negative electrode active material layer, respectively. Positive electrode active material layers and negative electrode active material layers were formed by printing a pattern generated on the computer using the inkjet printer.

The inkjet inlet parts were evaluated after application. The inlet parts exhibited softening due to interaction with NMP. When the affected inlet parts were replaced with suitable metal component and the electrode ink composition was supplied directly to the metal component from an associated reservoir, the issue resolved. In addition, because there was a possibility that the active materials might precipitate due to the relatively low viscosities of the ink compositions, the electrode ink compositions contained in the reservoir was agitated constantly using rotary blades.

The positive electrode ink composition and the negative electrode ink composition were introduced into the aforementioned modified inkjet printer, and prescribed patterns generated on the computer were printed in sequence on an aluminum foil having a thickness of 20 μm serving as a collector. Because it was difficult to feed the aluminum foil directly to the printer, the foil was attached to A4 size high-quality paper and then fed to the printer for printing. The volume of a droplet of the positive electrode ink and the negative electrode ink sprayed from the inkjet printer was approximately 2 μL. In addition, the printing operation was repeated five times on the same surface of the collector in order to control the thickness of the active material layers. The thickness of the positive electrode material layer and the negative electrode material layer formed was 5 μm, respectively. In addition, during the aforementioned printing step, drying was carried out for 2 h in a 60° C. vacuum oven each time a prescribed pattern was printed in order to remove the solvent.

A positive electrode formed with the positive electrode material layers on both sides and a negative electrode formed with the negative electrode material layers on both sides were created by repeating the same operations as those described above for the back surface of the collector on which the active material layer is formed. The respective electrodes were cut into a prescribed size.

Fabrication of Battery

Positive electrodes (10 units) and negative electrodes (11 units) fabricated as above were layered alternately with polypropylene separators of 20 μm thickness in order to fabricate a layered body as a battery element. Next, after an electrolyte was injected into the separators, the resulting layered body was vacuum-sealed using a laminate film serving as a case in order to complete the battery. A solution created by adding 1.0 mol/L of lithium salt to a mixture comprised of equal volumes of ethylene carbonate (EC) and propylene carbonate (PC) was used as the electrolyte.

Example 3

A positive electrode ink and a negative electrode ink were prepared using the technique outlined Example 2 except that quantity of surfactant added to the positive electrode ink composition and the negative electrode ink composition was 0.01 wt %, respectively. The positive electrodes and negative electrodes were fabricated as outlined in Example 2. Here, the portion equivalent to the change in the quantity of surfactant added was compensated by adjusting the quantity of NMP added.

Example 4

A positive electrode ink composition and a negative electrode ink composition were prepared using the same technique outlined in Example 2 except that the quantity of surfactant added to the positive electrode ink composition and the negative electrode ink composition was 1.0 wt %, respectively. The positive electrodes and negative electrodes were fabricated as outlined in Example 2. Here, the portion equivalent to the change in the quantity of surfactant added was compensated by adjusting the quantity of NMP added.

Example 5

A positive electrode ink and a negative electrode ink were prepared using the same technique as outlined in Example 2 except that the quantity of surfactant added to the positive electrode ink composition and the negative electrode ink composition was 10 wt %, respectively. Positive electrodes and negative electrodes were fabricated using the technique outlined in Example 2. Here, the portion equivalent to the change in the quantity of surfactant added was compensated by adjusting the quantity of NMP added.

Example 6

A positive electrode ink composition and a negative electrode ink composition were prepared using the technique as outlined in Example 2 except that the average grain size of the positive active material was 1.0 μm. The positive electrodes and negative electrodes were fabricated using the technique as outlined in Example 2.

Example 7

A positive electrode ink composition and a negative electrode ink composition were prepared using the technique outlined in Example 2 except that the average grain size of the positive active material was 0.05 μm. The positive electrodes and negative electrodes were fabricated according to the procedure outlined in Example 2.

Example 8

A positive electrode ink composition and a negative electrode ink composition were prepared using the technique outlined in Example 2 except that polyoxyethylene alkyl ether (ethylene oxide addition molar quantity: approximately 5-10 mol) (referred to as “surfactant B,” hereinafter), an ether-type surfactant, was used as the surfactant. Positive electrodes and negative electrodes were fabricated according to the procedure outlined in Example 2.

Example 9

A positive electrode ink corn position and a negative electrode ink composition were prepared using the technique as outlined in Example 2 except that polyoxyethylene alkylene ether (ethylene oxide addition molar quantity: approximately 5-10 mol) (referred to as "surfactant C," hereinafter), an ether-type surfactant, was used as the surfactant. The positive electrodes and negative electrodes were fabricated according to the procedure outlined in Example 2.

Application Example 10

A positive electrode ink composition and a negative electrode ink composition were prepared using the technique as outline in Example 2 except that a salt of β-naphthalenesulfonate formalin condensate (referred to as "surfactant D," hereinafter), an anionic surfactant, was used as the surfactant. Positive electrodes and negative electrodes were fabricated according to the procedure outlined in Example 2.

Application Example 11

A positive electrode ink composition and a negative electrode ink composition were prepared using the technique as outlined in Example 2 except that laurylmethylammonium chloride (referred to as "surfactant E," hereinafter), a cationic surfactant, was used as the surfactant. Positive electrodes and negatives electrode were fabricated according to the procedure outlined in Example 2.

Comparative Example 2

A positive electrode ink composition and a negative electrode ink composition were prepared using the same technique as outlined in Example 2 except that polyvinylidene fluoride (PVdF) was added at a quantity of 5 wt % instead of surfactant. Positive electrodes and negative electrodes were fabricated using the same technique as outlined in Example 2 except that the resulting positive electrode ink composition and the negative electrode ink composition were applied to the surface of the collector using a bar coater. Here, the thicknesses of the positive electrode material layer and the negative electrode material layer were controlled to be 20 μm, respectively.

Evaluation of Batteries

Bonding strength and post-vibration strength were measured for the electrodes as fabricated according to the following procedure. Similarly, the average reduction rates were measured for the electrodes fabricated.

Measurement of Bond Strength

A tension test was conducted for each of the electrodes as fabricated in conformance with the technique described in JIS K6253 (1993 Ed.) in order to measure bond strength. More specifically, a pulling jig was adhered to the surface of each of the positive electrodes fabricated in Examples 2-11 and Comparative Example 2 using an adhesive tape. The adhered jig and the collector were pulled at 180°, and the peel strength and the length were then measured. A graph showing the data measured for Example 2 and the Comparative Example 2 is shown in FIG. 10.

Figure 10:
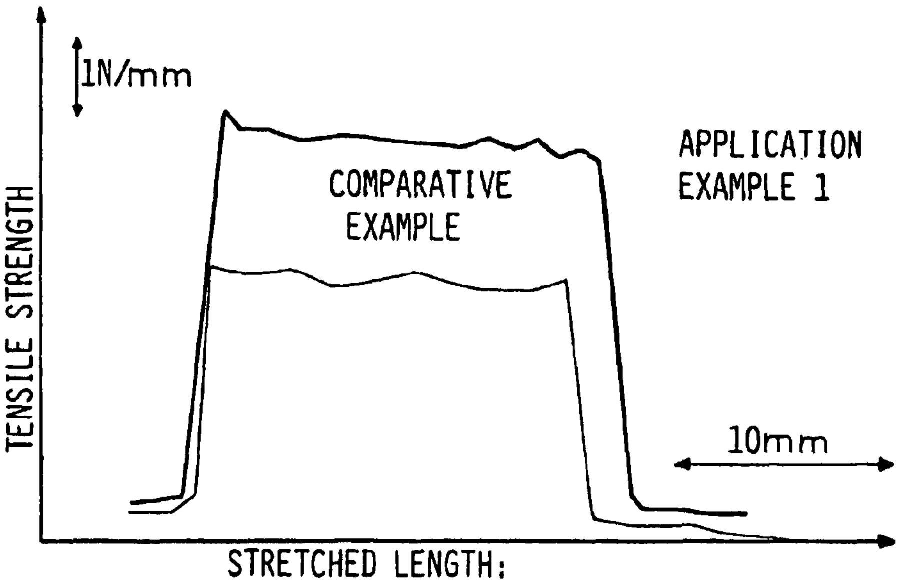
FIG. 10 is a graph of the measurement of bond strength data of Example 2 and Comparative Example 2.

In addition, the average value of the bond strength at the trapezoidal saddle parts in the graph of the measurement data in FIG. 10 was defined as the average value of the bonding strength. Ratios of the bond strength of the electrodes in Examples 2-11 with respect to Comparative Example 2 were computed. The computation results are shown in Table 2. Computations were made according the formula:

Bond strength ratio=(average bond strength value of an Individual Example/average bond strength value of Comparative Example 2)×100(%)

In other words, this indicates that the higher the bond strength ratio, the greater the bond strength is as compared with the Comparative Example.

Measurement of Post-Vibration Strength

A vibration test was conducted on each of the electrodes fabricated in Examples 2-11 and Comparative Example 2 in conformity with the technique promulgated under Automobile Component Vibration Testing Method (JIS D1601 (1995 Ed.)). The average bond strengths were measured in the same manner mentioned with respect to "Measurement of bond strength", and the ratios of the post-vibration strength of Examples 2-11 with respect to Comparative Example 2 before the vibration and after the vibration were computed in accordance with Mathematical formula 2:

Post-vibration bond strength ratio=(average post-vibration bond strength value of example/average bond strength value of Comparative Example 2 before vibration)×100(%)

Measurement of Average Reduction Rate by Vibration

Figure 11:
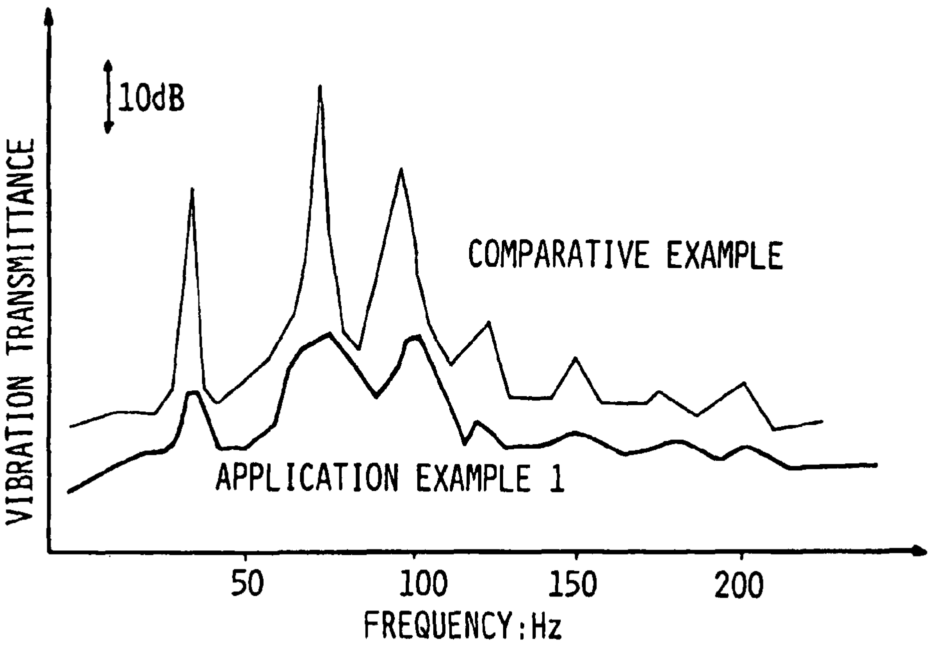
FIG. 11 is a chart of vibration transmittance spectra obtained for batteries prepared as outlined in Example 2 and Comparative Example 2.

An acceleration pickup was placed roughly at the center of each of the batteries fabricated in Examples 2-11 and Comparative Example 2. The vibration spectrum of the acceleration pickup when it was hit using an impulse hummer was measured. The placement method conformed with JIS B0908 (1991 Ed.) (Vibration and impact pickup correction method: Basic concept). The vibration spectra obtained were analyzed using an FFT analyzer and converted into dimensions of frequency and acceleration. The frequencies obtained through the conversion were averaged and attenuated in order to obtain vibration transmittance spectra. The value obtained by comparing the area of the first peak of the vibration transmittance spectrum of each Example 2-11 with that of Comparative Example 2 taken as 100% was defined as the average reduction rate and computed accordingly. It can be appreciated that that the smaller the value is, the greater the resistance to vibration. The computation results are shown in Table 2. In addition, for reference, vibration transmittance spectra obtained Example and the Comparative Example 2 are shown in FIG. 11.

TABLE 2

| | Surfactant | Surfactant content | Average grain size of positive electrode active material | Bonding strength ratio | Post-vibration bonding strength ratio | Average reduction rate |
|---|---|---|---|---|---|---|
| Ex. 1 | Surfactant A | 0.1 wt % | 0.2 μm | 150 | 149 | 70 |
| Ex. 2 | Surfactant A | 0.01 wt % | 0.2 μm | 110 | 108 | 80 |
| Ex. 3 | Surfactant A | 1.0 wt % | 0.2 μm | 200 | 198 | 60 |
| Ex. 4 | Surfactant A | 10.0 wt % | 0.2 μm | 300 | 220 | 50 |
| Ex. 5 | Surfactant A | 0.1 wt % | 1.0 μm | 140 | 13 | 75 |
| Ex. 6 | Surfactant A | 0.1 wt % | 0.05 μm | 160 | 158 | 65 |
| Ex. 7 | Surfactant B | 0.1 wt % | 0.2 μm | 145 | 145 | 73 |

TABLE 2-continued

| | Surfactant | Surfactant content | Average grain size of positive electrode active material | Bonding strength ratio | Post-vibration bonding strength ratio | Average reduction rate |
|---|---|---|---|---|---|---|
| Ex. 8 | Surfactant C | 0.1 wt % | 0.2 μm | 145 | 144 | 75 |
| Ex. 9 | Surfactant D | 0.1 wt % | 0.2 μm | 140 | 138 | 73 |
| Ex. 10 | Surfactant E | 0.1 wt % | 0.2 μm | 140 | 139 | 73 |
| Comparative Example | Absent | 5.0 wt % | 0.2 μm | 100 | 85 | 100 |

As is clear from Table 2, the electrodes obtained in Examples 2-11, all exhibited bond strength ratios and post-vibration bond strength ratios higher than those of Comparative Example 2. In addition, the batteries obtained in the Examples 2-11 all showed average reduction rates lower than that of Comparative Example 2. In addition, the electrodes obtained in Examples 2-11 exhibited little decrease in bond strengths before and after the vibration.

These results suggest that electrode prepared according to the alternate embodiment as disclosed herein in which surfactant is contained in the active material layer, exhibit improved binding property in the active material layer and demonstrate excellent resistance to vibration. Therefore, the resistance to vibration is improved in a battery in which the electrode as disclosed is adopted, so that a battery with excellent durability can be provided.

What is claimed:

1. A method for manufacturing an electrode layer comprising:
   - forming one of a positive and negative electrode layer by ejecting droplets of a first electrode ink composition from a first nozzle of an inkjet device onto a base material, the first electrode ink composition including at least one electrode active material in a solvent matrix; and
   - ejecting droplets of a second electrode ink composition from a second nozzle of the ink jet device onto the base material, the second electrode ink composition including at least one binder material in a solvent matrix wherein said first electrode ink composition and said second electrode ink composition are deposited in combination to form one of a positive electrode and a negative electrode layer.

2. The method of claim 1 wherein the first electrode ink composition further comprises at least one electroconductive material.

3. The method of claim 1 wherein the base material is a collector with an electrolyte film.

4. The method of claim 1 wherein the first electrode ink composition further comprises at least one surfactant material.

5. The method of claim 4 wherein the surfactant material is at least one of a carboxylic acid system surfactant and an ether-type nonionic surfactant.

6. The method of claim 5 wherein the ether-type nonionic surfactant is polyoxyethylene ether type nonionic surfactant.

7. The method of claim 4 wherein the surfactant material has an HLB value between 5 and 30.

8. The method of claim 4 wherein the surfactant material is present in the first electrode ink composition in an amount sufficient to provide 0.05-10 wt % in a resulting coating layer with respect to total quantity of the electrode active material in the resulting layer.

9. The method of claim 4 wherein the first electrode ink composition is employed to prepare a positive electrode and wherein the electrode active material in the first electrode ink composition is at least one of a Li—Mn oxide compound and a Li—Ni oxide compound.

10. The method of claim 4 wherein the first electrode ink composition is employed to prepare a negative electrode and wherein the electrode active material is at least one of a crystalline carbon material and a non-crystalline carbon material.

11. The method of claim 1 wherein the first electrode ink composition further comprises:
   - a surfactant compound; and wherein the at least one electrode active material comprises a particulate electrode active material.

12. The method of claim 11 wherein the particulate electrode active material has an average grain size between 0.01 μm and 1.0 μm.

13. The method of claim 11 wherein the first electrode ink composition has a total solids content between 5 wt % and 30 wt % based on total first electrode ink composition.

14. The method of claim 11 wherein the surfactant compound is present in an amount between 0.1 wt % and 5.0 wt % based on total first electrode ink composition.

* * * * *